United States Patent
Takasu et al.

(10) Patent No.: US 12,474,187 B2
(45) Date of Patent: Nov. 18, 2025

(54) LOSS ANALYSIS DEVICE AND LOSS ANALYSIS METHOD

(71) Applicant: ANRITSU CORPORATION, Kanagawa (JP)

(72) Inventors: Ryota Takasu, Kanagawa (JP); Taichi Murakami, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 199 days.

(21) Appl. No.: 18/332,085

(22) Filed: Jun. 9, 2023

(65) Prior Publication Data

US 2023/0400334 A1 Dec. 14, 2023

(30) Foreign Application Priority Data

Jun. 14, 2022 (JP) ................................. 2022-096119

(51) Int. Cl.
*G01D 5/353* (2006.01)

(52) U.S. Cl.
CPC ................................ *G01D 5/35358* (2013.01)

(58) Field of Classification Search
CPC ....................... G01D 5/35358; G01M 11/3145
See application file for complete search history.

(56) References Cited

U.S. PATENT DOCUMENTS

| | | | | |
|---|---|---|---|---|
| 5,066,118 A | * | 11/1991 | Buerli | G01M 11/3145 356/73.1 |
| 11,632,172 B2 | * | 4/2023 | Takasu | H04Q 11/0067 398/20 |
| 2020/0240872 A1 | * | 7/2020 | Murakami | G01M 11/3145 |
| 2022/0123832 A1 | * | 4/2022 | Takasu | G01M 11/3145 |
| 2022/0149938 A1 | * | 5/2022 | Pei | H04B 10/07951 |
| 2023/0400381 A1 | * | 12/2023 | Takasu | H04B 10/071 |
| 2023/0400383 A1 | * | 12/2023 | Takasu | G01M 11/3145 |

FOREIGN PATENT DOCUMENTS

JP 2012-167935 A 9/2012

\* cited by examiner

*Primary Examiner* — Jonathan M Hansen
(74) *Attorney, Agent, or Firm* — McDonald Hopkins LLC

(57) ABSTRACT

An object of the present disclosure is to provide a loss analysis device and a loss analysis method of detecting an event with high reproducibility when an SN ratio is small or when an event interval is short. According to the present disclosure, a loss analysis device includes an OTDR waveform acquisition unit that acquires an OTDR waveform of a measurement target optical fiber, and a calculation unit that performs nonlinear fitting of an event model function to the OTDR waveform and calculates a position of a start point of each event included in the OTDR waveform, a level at the start point of each event, a loss of each event, and a return loss of each event, the event model function using the position, the level, the loss, and the return loss as parameters.

4 Claims, 1 Drawing Sheet

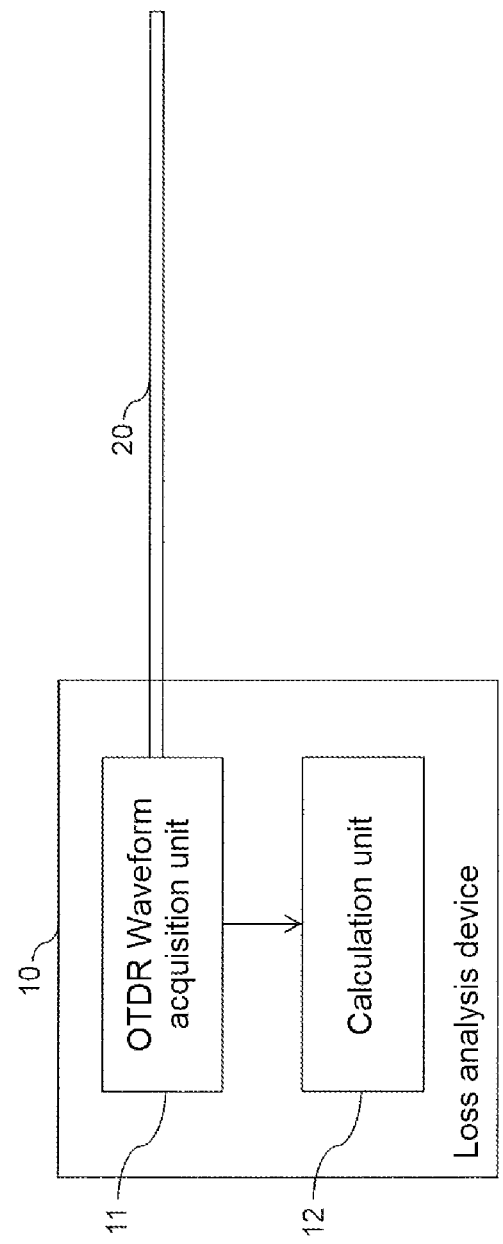

LOSS ANALYSIS DEVICE AND LOSS ANALYSIS METHOD

TECHNICAL FIELD

The present disclosure relates to a loss analysis device and a loss analysis method using an event model function.

BACKGROUND ART

A method of detecting an event occurring in a measurement target optical fiber based on a measured optical time domain reflectometer (OTDR) waveform is known (see Patent Document 1, for example). A device according to the related art measures an OTDR waveform in a measurement target optical fiber, extracts a change point in the measured OTDR waveform, and generates an ideal waveform when an event occurs at the change point. Then, the device extracts a difference between the measured OTDR waveform and the ideal waveform. When there is a difference amount, the device determines that there is an undetected event at a position of the difference amount, and detects all events included in the OTDR waveform.

Specifically, the device according to the related art detects the change point of an inclination of the OTDR waveform in order to calculate the position of the event. Also, in the device according to the related art, a least-square approximation straight line for the OTDR waveform is used to calculate an event loss.

RELATED ART DOCUMENT

Patent Document

[Patent Document 1] JP-A-2012-167935

DISCLOSURE OF THE INVENTION

Problem that the Invention is to Solve

However, the related art has a problem that the reproducibility of the position of a start point of the event is low when an SN ratio is poor. Also, the related art has a problem that the reproducibility of an event loss value is low when events are adjacent to each other.

In order to solve the above problems, an object of the present disclosure is to provide a loss analysis device and a loss analysis method of detecting an event with high reproducibility when an SN ratio is small or when an event interval is short.

Means for Solving the Problem

In order to achieve the above object, a loss analysis device according to the present disclosure performs nonlinear fitting of an event model function to an OTDR waveform.

Specifically, the loss analysis device according to the present disclosure includes an OTDR waveform acquisition unit that acquires an OTDR waveform of a measurement target optical fiber, and a calculation unit that performs nonlinear fitting of an event model function to the OTDR waveform and calculates a position of a start point of each event included in the OTDR waveform, a level at the start point of each event, a loss of each event, and a return loss of each event, the event model function using the position, the level, the loss, and the return loss as parameters.

In the loss analysis device according to the present disclosure, the calculation unit may perform nonlinear fitting by using a trust region method that is a nonlinear least-square approximation algorithm.

In the loss analysis device according to the present disclosure, the calculation unit may use an event model function $y_{fit}$ of the following expression (1) as the event model function.

$$y_{fit}(x) = y_{bs}(x-s_x, s_y) \cdot y_{loss}(x-s_x, l) + y_{refl}(x-s_x, r) \quad (1)$$

Where x is a distance, $y_{bs}$ is a backscattering function, $y_{loss}$ is a loss function, $y_{refl}$ is a reflection function, $s_x$ is a position of the start point of the event [km], $s_y$ is the level at the start point of the event [dB], l is a loss value [dB], and r is the return loss [dB].

Specifically, the loss analysis method according to the present disclosure includes an OTDR waveform acquisition step of acquiring an OTDR waveform of a measurement target optical fiber, and a calculation step of performing nonlinear fitting of an event model function to the OTDR waveform and calculating a position of a start point of each event included in the OTDR waveform, a level at the start point of each event, a loss of each event, and a return loss of each event, the event model function using the position, the level, the loss, and the return loss as parameters.

In the loss analysis method according to the present disclosure, in the calculation step, nonlinear fitting may be performed by using a trust region method that is a nonlinear least-square approximation algorithm.

In the loss analysis method according to the present disclosure, in the calculation step, an event model function $y_{fit}$ of the following expression (1) may be used as the event model function.

$$y_{fit}(x) = y_{bs}(x-s_x, s_y) \cdot y_{loss}(x-s_x, l) + y_{refl}(x-s_x, r) \quad (1)$$

Where x is the distance, $y_{bs}$ is the backscattering function, $y_{loss}$ is the loss function, $y_{refl}$ is the reflection function, $s_x$ is the position of the event start point [km], $s_y$ is the event start point level [dB], l is the loss value [dB], and r is the return loss [dB].

The above inventions can be combined as much as possible.

Advantage of the Invention

According to the present disclosure, it is possible to provide a loss analysis device and a loss analysis method of detecting an event with high reproducibility when an SN ratio is small or when an event interval is short.

BRIEF DESCRIPTION OF THE DRAWINGS

FIG. 1 illustrates an example of a schematic configuration of a loss analysis device according to Embodiment 1.

BEST MODE FOR CARRYING OUT THE INVENTION

Hereinafter, an embodiment of the present disclosure will be described in detail with reference to the drawings. The present disclosure is not limited to the embodiment described below. These implementation examples are merely illustrative, and the present disclosure can be implemented in various modified and improved forms based on the knowledge of those skilled in the art. It is assumed that, in this specification and the drawings, components having the same reference numerals are the same as each other.

Embodiment 1

FIG. 1 illustrates an example of a schematic configuration of a loss analysis device according to the present embodiment. According to the present embodiment, the loss analysis device includes an OTDR waveform acquisition unit 11 that acquires an OTDR waveform of a measurement target optical fiber 20, and a calculation unit 12 that performs nonlinear fitting of an event model function to the OTDR waveform and calculates a position of a start point of each event included in the OTDR waveform, a level at the start point of each event, a loss of each event, and a return loss of each event. The event model function uses the position of the start point of each event, the level at the start point of each event, the loss of each event, and the return loss of each event, as parameters. The description will be made below on the assumption that a "loss" of an event is a "loss value". The parameters of an event refer to the position of the start point of the event [km], the level at the start point of the event [dB], the loss value of the event [dB], and the return loss of the event [dB].

(OTDR Waveform Acquisition Step)

The OTDR waveform acquisition unit 11 acquires an OTDR waveform from a measurement target optical fiber 20. For example, the OTDR waveform acquisition unit 11 enters an optical pulse from one end of the measurement target optical fiber 20, and acquires the time distribution of the intensity of backscattered light output from the one end of the measurement target optical fiber 20 into which the optical pulse is entered, as an OTDR waveform. A "distance from one end of the measurement target optical fiber 20 into which the optical pulse is entered" is referred to as a "distance" below.

(Calculation Step)

The calculation unit 12 performs nonlinear fitting of the event model function to the OTDR waveform acquired by the OTDR waveform acquisition unit 11, and calculates the position of the start point of an event, the level at the start point of the event, the loss value of the event, and the return loss of the event.

Specifically, the calculation unit 12 may use Expression (1) as the event model function $y_{fit}$.

$$y_{fit}(x) = y_{bs}(x-s_x, s_y) - y_{loss}(x-s_x, l) + y_{refl}(x-s_x, r) \quad (1)$$

Here, x represents a distance, $y_{bs}$ represents a backscattering function, $y_{loss}$ represents a loss function, $y_{refl}$ represents a reflection function, $s_x$ represents a position of the start point of the event [km], $s_y$ represents the level at the start point of the event [dB], l represents a loss value [dB], and r represents the return loss [dB].

The backscattering function $y_{bs}$ may be defined by Expression (2).

$$y_{bs}(x, s_y) = s'_y \cdot 10^{-\frac{\alpha_{dB}}{5}x} \quad (2)$$

Here, $\alpha_{dB}$ is the inclination of backscattering [dB/km], and $s'_y$ is obtained from $s_y$ and Expression (3)

$$s'_y = 10^{\frac{s_y}{5}} \quad (3)$$

The loss function $y_{loss}$ may be defined by Expression (4).

$$y_{loss}(x,l) = 1-(1-l') \cdot y'_{loss}(x) \quad (4)$$

Here, l' is obtained from the loss value l and Expression (5), and $y'_{loss}$ is obtained from Expression (6).

$$l' = 10^{-\frac{l}{5}} \quad (5)$$

$$y'_{loss}(x) = \begin{cases} 0 & (x < 0) \\ \frac{1}{w}x + \frac{\tau}{w}e^{-\frac{x}{\tau}} - \frac{\tau}{w} & (0 \le x < w) \\ \frac{\tau(1-e^{\frac{w}{\tau}})}{w}e^{-\frac{x}{\tau}} - 1 & \text{(otherwise)} \end{cases} \quad (6)$$

τ represents a time constant [km], and w represents a pulse width [km].

The reflection function $y_{refl}$ may be defined by Expressions (7) and (8).

$$y_{refl}(x, r) = \frac{r'}{T_r} \begin{cases} 0 & \left(x \le -\frac{T_r}{2}\right) \\ \left(1-e^{\frac{w}{\tau}}\right)\left(e^{-\frac{T_r}{2\tau}} - e^{\frac{T_r}{2\tau}}\right)e^{-\frac{r}{\tau}} & \left(x > w + \frac{T_r}{2}\right) \\ -\frac{1}{\tau}x + \left(\left(1-e^{\frac{w}{\tau}}\right)e^{-\frac{T_r}{2\tau}} - e^{\frac{T_r}{2\tau}}\right)e^{-\frac{r}{\tau}} + \left(\frac{T_r}{2\tau} + \frac{w}{\tau} + 1\right) & \left(x > w - \frac{T_r}{2}, x > \frac{T_r}{2}\right) \\ \left(e^{-\frac{T_r}{2\tau}} - e^{\frac{T_r}{2\tau}}\right)e^{-\frac{r}{\tau}} + \frac{T_r}{\tau} & \left(w \ge \frac{T_r}{2}, x \le w - \frac{T_r}{2}\right) \\ \left(\left(1-e^{\frac{w}{\tau}}\right)e^{-\frac{T_r}{2\tau}}\right)e^{-\frac{r}{\tau}} + \frac{w}{\tau} & \left(w < \frac{T_r}{2}, x \le \frac{T_r}{2} - w\right) \\ \frac{1}{\tau}x + \left(e^{-\frac{T_r}{2\tau}}\right)e^{-\frac{r}{\tau}} + \left(\frac{T_r}{2\tau} - 1\right) & \text{(otherwise)} \end{cases} \quad (7)$$

$$r' = 10^{\frac{s_y}{5}} \cdot 10^{\frac{r+b}{10}} \quad (8)$$

$T_r$ represents a pulse rise distance [km], and b represents a backscattering coefficient [dB].

The calculation unit 12 performs nonlinear fitting of the event model function $y_{fit}$ represented by Expression (1) to the OTDR waveform. The nonlinear fitting according to the present embodiment means that the event model function $y_{fit}$ is set to a non-linear function, and the least square method is performed between the OTDR waveform and the event model function $y_{fit}$. For example, the calculation unit 12 performs nonlinear fitting by using a trust region method that is a nonlinear least-square approximation algorithm. The calculation unit 12 calculates the position $s_x$ of the start point of an optimal event, the level $s_y$ at the start point of the event, the loss value l, and the return loss r by the nonlinear fitting.

When the event is a non-reflection event, the initial value of the position $s_x$ of the start point of the event may be set to a point obtained by subtracting the number of points of a pulse width from an event candidate point detected from the OTDR waveform. When the event is a reflection event, the initial value of the position $s_x$ of the start point of the event may be set to the minimum level within a range of the maximum level from the start point of the event candidate detected from the OTDR waveform. Here, the event candidate point may be set to a peak point of the absolute value of an inclination detected by using the differentiation method for the OTDR waveform, or a peak point of the absolute value of a wavelet coefficient detected by using wavelet transform on the OTDR waveform. The initial value of the level $s_y$ at the start point of an event may be set to a level [dB] of the OTDR waveform at the position $s_x$ of the start point of the event. The initial value of the loss value l may be set to a value obtained by converting the ratio of the level at the position $s_x$ of the start point of the event and the level at a position of the end point of the event in terms of dB. The initial value of the return loss r may be set to a value obtained by converting the difference between the level at the position $s_x$ of the start point of the event and the maximum level in terms of the return loss.

Also, a fitting range may be set to a range obtained by expanding a range from the position of the start point of an event candidate to be fitted to the position of the end point of the event candidate by twice the pulse width.

The loss analysis device according to the present embodiment may include an event detection unit that detects an event candidate from the OTDR waveform in order to set the initial value of the position $s_x$ of the start point of an event and fitting range. For example, the event detection unit may detect an event candidate by using the differentiation method for the OTDR waveform acquired by the OTDR waveform acquisition unit 11 before the calculation unit 12 performs nonlinear fitting. The event detection unit may detect an event candidate point by applying wavelet transform to the OTDR waveform acquired by the OTDR waveform acquisition unit 11 before the calculation unit 12 performs nonlinear fitting.

When the OTDR waveform includes a plurality of events, the calculation unit 12 uses Expression (9) instead of Expression (1) as the event model function.

$$y_{fit}(x) = y_{bs}(x - s_{x,1}, s_{y,1}) \cdot \prod_n y_{loss}(x - s_{x,n}, l_n) + \sum_n y_{refl}(x - s_{x,n}, r_n) \quad (9)$$

n represents an event number, Π represents the product, and Σ represents the sum of products. The event number may be assigned in order from the event on the incident end side of the measurement target optical fiber 20. Also, a loss value ln of an event having an event number n may be obtained by Expressions (10) and (11) except for the event at the farthest end.

$$l_n = -5 \cdot \log_{10}\left(1 - \frac{1 - l'_n}{y'_{loss}(s_{x,n+1} - s_{x,n})}\right) \quad (10)$$

$$l'_n = \frac{s'_{y,n} - \sum_{i=1}^{n} y_{refl}(s_{x,n+1} - s_{x,i}, r_i)}{y_{bs}(s_{x,n} - s_{x,1}, s_{y,1}) \cdot \prod_{i=1}^{n-1} y_{loss}(s_{x,n+1} - s_{x,i}, l_i)} \quad (11)$$

When the OTDR waveform includes two events, the calculation unit 12 may simultaneously optimize the parameters of the two events.

Further, when the OTDR waveform includes three or more events, the calculation unit 12 optimizes parameters for each event. The calculation unit 12 may perform the nonlinear fitting in order from the event with the largest initial value of the loss value among the events for which the nonlinear fitting has not been completed.

For example, a case where the OTDR waveform includes Event 1 to Event 3 will be described. Assuming that the initial value of the loss value for each event is large in order of Event 1, Event 2, and Event 3, the initial value of the loss value of Event 1 is the largest among the events for which the nonlinear fitting has not been completed. Therefore, nonlinear fitting is performed for Event 1 while the parameters of Event 2 and Event 3 are fixed at the initial values. Thus, for Event 1, a position $s_{x,1}$ of the start point, a level $s_{y,1}$ of the start point, a loss value $l_1$, and a return loss $r_1$ are calculated. Subsequently, the initial value of the loss value of Event 2 is the largest among the events for which nonlinear fitting has not been completed. Nonlinear fitting is performed for Event 2 while the parameters of Event 3 are fixed at the initial values, and the parameters of Event 1 are fixed at the calculated values. Thus, for Event 2, a position $s_{x,2}$ of the start point, a level $s_{y,2}$ of the start point, a loss value $l_2$, and a return loss $r_2$ are calculated. Finally, nonlinear fitting is performed for Event 3 for which nonlinear fitting has not been completed while the parameters of Event 1 and Event 2 are fixed at the calculated values. Thus, for Event 3, a position $s_{x,3}$ of the start point, a level $s_{y,3}$ of the start point, a loss value $l_3$, and a return loss $r_3$ are calculated.

As described above, the loss analysis device and loss analysis method according to the present disclosure perform nonlinear fitting of the event model function to the OTDR waveform, so that, when the SN ratio is small or the event interval is short, it is possible to detect the event with high reproducibility.

INDUSTRIAL APPLICABILITY

The loss analysis device and the loss analysis method according to the present disclosure can be applied to the optical measuring instrument industry.

DESCRIPTION OF REFERENCE NUMERALS AND SIGNS

10 Loss Analysis Device
11 OTDR Waveform Acquisition Unit
12 Calculation Unit
20 Measurement Target Optical Fiber

What is claimed is:

1. A loss analysis device comprising:
an OTDR waveform acquisition unit that acquires an OTDR waveform of a measurement target optical fiber; and
a calculation unit that performs nonlinear fitting of an event model function to the OTDR waveform and calculates a position of a start point of each event included in the OTDR waveform, a level at the start point of each event, a loss of each event, and a return loss of each event, the event model function using the position, the level, the loss, and the return loss as parameters,
wherein the calculation unit uses an event model function $y_{fit}$ of the following expression (1) as the event model function:

$$y_{fit}(x) = y_{bs}(x - s_x, s_y) \cdot y_{loss}(x - s_x, l) + y_{refl}(x - s_x, r) \quad (1)$$

where x is a distance, $y_{bs}$ is a backscattering function, $y_{loss}$ is a loss function, $y_{refl}$ is a reflection function, $s_x$ is the position of the start point of the event [km], $s_y$ is the level at the start point of the event [dB], l is a loss value [dB], and r is the return loss [dB].

2. The loss analysis device according to claim 1, wherein the calculation unit performs nonlinear fitting by using a trust region method that is a nonlinear least-square approximation algorithm.

3. A loss analysis method comprising:
 an OTDR waveform acquisition step of acquiring an OTDR waveform of a measurement target optical fiber; and
 a calculation step of performing nonlinear fitting of an event model function to the OTDR waveform and calculating a position of a start point of each event included in the OTDR waveform, a level at the start point of each event, a loss of each event, and a return loss of each event, the event model function using the position, the level, the loss, and the return loss as parameters,
 wherein in the calculation step, an event model function $y_{fit}$ of the following expression (1) is used as the event model function:

$$y_{fit}(x) = y_{bs}(x - s_x, s_y) \cdot y_{loss}(x - s_x, l) + y_{refl}(x - s_x, r) \tag{1}$$

where x is a distance, $y_{bs}$ is a backscattering function, $y_{loss}$ is a loss function, $y_{refl}$ is a reflection function, $s_x$ is the position of the start point of the event [km], $s_y$ is the level at the start point of the event [dB], l is a loss value [dB], and r is the return loss [dB].

4. The loss analysis method according to claim 3, wherein in the calculation step, nonlinear fitting is performed by using a trust region method that is a nonlinear least-square approximation algorithm.

* * * * *